United States Patent [19]

Wassell et al.

[11] 4,235,836

[45] Nov. 25, 1980

[54] METHOD FOR MAKING THERMAL INSULATING, FIRE RESISTANT MATERIAL

[75] Inventors: Leonard L. Wassell, Didcot; Gerald B. Cole, Hungerford; Alan Briggs, Didcot; James F. Pollock, Hook, all of England

[73] Assignee: United Kingdom Atomic Energy Authority, London, England

[21] Appl. No.: 4,863

[22] Filed: Jan. 19, 1979

[30] Foreign Application Priority Data

Jan. 31, 1978 [GB] United Kingdom ............... 3928/78

[51] Int. Cl.$^3$ ............................................. C04B 43/00
[52] U.S. Cl. ................... 264/333; 106/15.05; 106/18.12; 106/84; 106/122; 252/8.1; 252/62
[58] Field of Search .............. 106/15.05, 84, 122, 106/18.12; 252/62, 8.1; 264/333

[56] References Cited

U.S. PATENT DOCUMENTS

| | | | |
|---|---|---|---|
| 3,686,383 | 8/1972 | Makinen | 264/120 |
| 4,037,015 | 7/1977 | Kolke et al. | 106/122 |

FOREIGN PATENT DOCUMENTS

| | | |
|---|---|---|
| 682432 | 11/1952 | United Kingdom . |
| 1058615 | 2/1967 | United Kingdom . |
| 1279628 | 6/1972 | United Kingdom . |

*Primary Examiner*—Lorenzo B. Hayes
*Attorney, Agent, or Firm*—Larson, Taylor and Hinds

[57] ABSTRACT

The invention relates to thermally insulating, fire resistant material and its production.

A problem associated with fire resistant material comprising refractory material and a binder is the tendency, in use, of the material to disintegrate due to bond failure. In the invention, hollow particles of a glass or of a ceramic are combined with a binder to give a material where the proportions of binder are such that the material is capable of deformation at high temperatures (e.g. up to 1100° C.) without fracture or loss of cohesion. A specific example consists of 93% by weight of hollow spherical particles of pulverized fuel ash and 7% by weight of sodium silicate binder. The material is particularly useful in the protection of steel structures.

3 Claims, No Drawings

METHOD FOR MAKING THERMAL INSULATING, FIRE RESISTANT MATERIAL

The invention relates to thermally insulating, fire resistant material and its production; the material makes use of hollow particles of a glass or of a ceramic together with a binder.

Pulverised fuel ash (usually referred to as PFA) is a well-known material which is obtained as a by-product from the combustion of coal in power stations. An alternative name for pulverised fuel ash is fly ash. There are a number of examples in the art of the use of PFA in combination with binders and fillers for the production of refractory compositions. See, for example, U.K. Patent Specifications Nos. 1 339 483, 1 295 599, 1 095 751, 1 058 615, 1 019 636, 977 191, 737 261 and 737 262. It is also known in the art to use, in a similar way, hollow spherical particles which constitute a part of PFA. See, for example, U.K. Patent Specifications Nos. 1 279 628, 1 279 096 and 682 432. Such particles are separated from PFA by depositing the PFA into a lagoon; the spherical particles float and the remainder of the PFA sinks.

A problem associated with the above known compositions is their tendency to disintegrate because of bond failure when subjected to very high temperatures loading to loss of material by ablation.

The present invention is concerned with material consisting of hollow particles of material such as PFA in association with a binder, where the proportion of binder is such that the material is surprisingly able to withstand very high temperatures without disintegration due to bond failure.

Thus, in a first aspect, the invention provides a thermally insulating, fire resistant material consisting of hollow particles of a glass or of a ceramic and a binder for the particles, wherein the binder is such that and its proportion by weight in the material is sufficiently low that the material is capable of deformation at temperatures of up to 1100° C. without any substantial fracture or loss of cohesion thereof.

The material of the invention, when in a suitably shaped form, may be useful, for example, in the protection of structural steelwork. Thus, in a severe fire, the surface of a material in the proximity of the fire may reach a temperature of up to 1100° C. or 1200° C., which is above the melting point of many binders. However, the material of the invention is able to 'follow' changes in the geometry of a substrate to which it is clad at elevated temperatures without fracture or loss of cohesion, thereby to provide insulation and fire protection properties under such conditions, i.e., the material can 'follow' deformation of the substrate by virtue of its own high temperature plasticity.

It might be expected that a material held together by a binder would disintegrate because of bond failure under the above conditions, leading to loss of material by ablation. However, this does not happen with the material of the invention. A possible explanation is that surface tension forces in the softened binder meniscus formed between the particles at high temperatures are sufficiently strong to prevent ablation and the material therefore continues to perform its thermal insulating function.

The proportion of binder in our material has to be sufficiently low to ensure that the refractory behaviour of the material is not impaired yet sufficiently high to allow the material to accommodate imposed stresses at high temperatures by limited plastic deformation. Such proportions will, however, depend also upon the nature of the binder and of the particles.

The hollow particles in the material of the invention are preferably spherical. A preferred example is constituted by the abovementioned hollow spherical particles of PFA. Such spherical particles are, for example, marketed by the Central Electricity Generating Board under the trade name "Cenospheres", which are lightweight, thin-walled, hollow, spherical particles of PFA with diameters in the range of 20 to 200 microns. Spherical particles of PFA are of an alumino-silicate glass. Other examples of hollow particles which may be used in the material are those of refractory ceramics such as alumina and zirconia.

The binder in the material of the invention may, for example, be a silicate binder, such as sodium or potassium silicate, when we prefer that the binder constitutes from 4% to 10% by weight of the material. Silicate binders are particularly useful when the hollow particles are of PFA. More particularly, we prefer that the material contains from 6% to 7% by weight of sodium silicate. Other binders which may be used are glasses having higher softening points than the alkali silicates, and which are suitable when higher deformation temperatures are required, or when the hollow particles are of substances such as alumina which are more refractory than PFA.

The material of the invention may, if desired, contain one or more additional components provided, of course, that such components do not interfere with the abovementioned high temperature deformation properties of the material. Thus, the material must not contain substantial proportions of fillers which, if present, would deleteriously affect high temperature performance.

A preferred embodiment of the invention is a material which consists essentially of from 90% to 95% by weight of hollow spherical particles of PFA and from 5% to 10% by weight of a sodium silicate binder, wherein material consisting essentially of 93% by weight of hollow spherical particles of PFA and 7% by weight of sodium silicate is particularly preferred. We can, in fact, fabricate material consisting essentially of from 74% to 98% by weight of hollow spherical particles of PFA and from 2% to 26% by weight of sodium silicate. We have found, though, that if much less than 5% of sodium silicate binder is used, the material may still be usable, but only with careful handling, because of its resulting friability. If much more than 10% of sodium silicate binder is used, the material is very robust, but is an inferior thermal insulator because of its higher density. Also, an increase in the sodium silicate content leads to a reduction in the heat resistance of the material.

The material of the invention may conveniently be made by forming into a desired shape a mix of appropriate composition, followed by curing the binder. The material may suitably be made in the form of flat panels or of segments of hollow cylinders. However, since our material in its preferred composition contains low proportions of binder which make conventional casting very difficult, we prefer to carry out the shaping of the mix by pressing which constitutes a second aspect of our invention. Thus, in a second aspect the invention provides a method of making a thermally insulating fire resistant material which comprises the steps of (i) pressing into a shape a mix consisting of hollow particles of a glass or of a ceramic and a binder for the particles; and (ii) curing the pressed mix to give the thermally insulating, fire resistant material, where the binder is such that and its proportion by weight is sufficiently low that the final material is capable of deformation at any temperature below 1100° C. without any substantial fracture or loss of cohesion thereof.

The pressing may conveniently be carried out between sandwich plates where it is desired to form the mix into a panel. Such sandwich plates may, for example, be of metal, such as aluminium alloy. The surfaces of the plates in contact with the pressed mix should be flat and smooth. The pressing is conveniently carried out in the range of 0.35 to 3.5 $MNm^{-2}$ (50 to 500 p.s.i.). 1.4 $MNm^{-2}$ (200 p.s.i.) is preferred as it gives the best compromise between strength and thermal conductivity in the final panel. For applications in which lower strengths are acceptable, pressing may be carried out at a pressure of 0.35 $MNm^{-2}$ (50 p.s.i.), in which case the thermal conductivity of the material is reduced.

The resulting pressed mix is very fragile and is therefore best handled whilst still sandwiched between plates. Thus, in carrying out the curing step, the sandwiched, pressed mix may be transferred to a curing oven and the mix cured between the plates. The presence of the sandwich plates prevents warping and shrinkage cracking during curing. Also, we prefer to use a preheated oven since this prevents tear-cracking of the panel.

The mix may be prepared by conventional means, provided that care is taken to ensure homogeneity. If a sodium or potassium silicate binder is required in the final material an aqueous solution thereof may be provided in the mix. If a higher melting point glass binder is required in the final product, a sol of its constituent oxides may be provided in the mix. Examples of such sols are boehmite sol and "Syton" (Registered Trade Mark) silica sol, as supplied by Monsanto Chemicals Limited. A phosphate bond, as supplied by Super Refractories Limited, may also be used.

The invention also provides, in a third aspect, a pressable mix consisting of hollow particles of a glass or of a ceramic and a binder for the particles and of a composition such that it is convertible, on curing, to a material according to the first aspect of the invention.

One way of carrying out the invention is described in detail, by way of example only, as follows:

EXAMPLE 1

Mixing

Hollow spherical particles of PFA in the form of "Cenospheres" and an aqueous sodium silicate solution (the 100 Ordinary brand supplied by Crossfields and containing 43.6% by weight solids) were mixed in a modified Gardner chain mixer to give a mix containing 87% by weight of "Cenospheres" and 13% by weight of the aqueous solution. Care was taken during mixing to ensure that the solution was thoroughly dispersed with respect to the "Cenospheres" in order to prevent the formation of silicate-rich lumps in the final product (If such lumps do form, they may cause spontaneous fracture of the panels after curing). This was done by distributing the solution through a perforated tube positioned parallel to the axis of the mixer but offset to one side. A weighed quantity of the solution was poured through the tube onto a weighed quantity of PFA "Cenospheres" whilst the latter were being agitated by the mixer running at low speed for two minutes. High speed mixing was then carried out for four minutes, and the resulting mix ejected through a bottom door of the mixer by operation thereof for a further two minutes at low speed.

Pressing

A 12.5 Kg batch of the above produced mix was transferred to a 700×700 mm steel die in which an aluminum alloy 'false platen' had previously been placed. The mix was evenly distributed and a second 'false platen' placed on top of it. The thickness of the platens was 12 mm. The mix was immediately pressed at 1.4 $MNm^{-2}$ (200 p.s.i.), the pressure released after 30 seconds and the pressed mix ejected as a sandwich between the two aluminium plates. (Further experiments have shown that releasing of the pressure after 5 seconds may be sufficient).

Curing

The pressed mix, still between the plates, was transferred to a curing oven pre-heated at 200° C. The preheated oven generated a film of steam between the mix and plates to break friction contact between them and allow differential expansion to take place freely and prevent formation of tear cracks. The pressed mix was left in the oven for 3 hours to give a cured material of hollow spherical particles of PFA and sodium silicate binder in the form of a panel, 50 mm thick. The panel was allowed to cool in the oven. (Further experiments have shown that a cured panel can be removed from the oven at 200° C. and allowed to cool naturally without damage).

Testing

A series of 100 panels, each produced as described above, was used to clad a 3 meter steel column and a 7 meter steel beam. The clad structures were then subjected to a fire which raised the temperature of the outer surface of the cladding to 1115° C., i.e., well in excess of the melting point of the sodium silicate binder (840° C.).

In the case of the beam, the time taken for the cladding to reach 1115° C. was 3 hours, by which time the temperature of the steel beam had risen to only 520° C. There was no failure of the cladding panels during the test even though the beam sagged 125 mm at its centre. This deformation was accommodated by the cladding with no loss of material.

In the case of the column, the time taken to reach 1115° C. was 2 hours 45 minutes during which time there was no failure of the cladding panels.

Measurements of the flexural strength of specimens cut from a panel produced as described above were carried out over a range of temperatures. At 515° C. some plastic deformation was noted before fracture, and at 540° C. specimens did not fracture but simply bent. It is noteworthy that structural steel also begins to deform plastically at a similar temperature.

We claim:

1. A method of making a thermally insulating, fire resistant material which comprises the steps of
   (i) pressing into a shape a mix consisting of hollow spherical particles of pulverised fuel ash and sodium silicate; and (ii) curing the pressed mix to give the thermally insulating, fire resistant material;
in which method the proportions of particles and sodium silicate in the mix are such that the thermally insulating, fire resistant material consists essentially of from 90% to 95% by weight of the particles and from 5% to 10% by weight of the sodium silicate.

2. A method according to claim 1 wherein the pressing is carried out at a pressure within the range of 0.35 to 3.5 $MNm^{-2}$.

3. A method according to claim 2 wherein the pressing is carried out between sandwich plates and the curing is carried out while the pressed mix is carried between said plates.

* * * * *